United States Patent [19]
Kuroda et al.

[11] Patent Number: 5,294,495
[45] Date of Patent: Mar. 15, 1994

[54] MAGNETIC RECORDING MEDIUM

[75] Inventors: Kazuhiro Kuroda, Chiba; Yasushi Ishikawa, Saku; Kazushi Tanaka, Komoro, all of Japan

[73] Assignee: TDK Corporation, Tokyo, Japan

[21] Appl. No.: 816,999

[22] Filed: Jan. 3, 1992

[30] Foreign Application Priority Data

Jan. 8, 1991 [JP] Japan ................................. 3-11532
Jan. 8, 1991 [JP] Japan ................................. 3-11533

[51] Int. Cl.$^5$ ........................... G11B 5/66; B32B 5/16
[52] U.S. Cl. ........................ 428/694 B; 428/694 BB; 428/694 BN; 428/329
[58] Field of Search ............... 428/328, 329, 323, 694, 428/900, 684 B, 684 BN, 684 BB

[56] References Cited

U.S. PATENT DOCUMENTS

| 4,741,952 | 5/1988 | Aoyama et al. | 428/323 |
| 4,756,962 | 7/1988 | Takamatsu et al. | 428/329 |
| 4,917,947 | 4/1990 | Kosha et al. | 428/329 |
| 5,110,774 | 5/1992 | Ogura | 501/126 |

Primary Examiner—Paul J. Thibodeau
Assistant Examiner—Leszek Kiliman
Attorney, Agent, or Firm—Sprung Horn Kramer & Woods

[57] ABSTRACT

A magnetic layer of a magnetic recording medium comprising a magnetic powder dispersed in a binder resin contains a powder of Ti-containing $Al_2O_3$. The magnetic recording medium may alterenatively incorporate the Ti-containing $Al_2O_3$ powder in the back coating or in both the magnetic layer and the back coating. A superior running stability and a superior durability are attained.

4 Claims, No Drawings

MAGNETIC RECORDING MEDIUM

THE TECHNICAL FIELD OF THE INVENTION

The present invention relates to a magnetic recording medium and more particularly to a magnetic recording medium having a superior running stability and a superior durability.

PRIOR ART

It has been a general practice in the art to incorporate one or more non-magnetic materials such as $Al_2O_3$, $Cr_2O_3$, $TiO_2$, $SiO_2$, $SiC$, $\alpha\text{-}Fe_2O_3$ and $ZnO$ in the magnetic layers of magnetic recording mediums such as video tapes, audio tapes, flexible discs, computer memory tapes and the like, in order to prevent the magnetic layers from incurring damages. However, an improper selection of the types of the inorganic materials, the particle sizes, the amount to be added has often led to impairment of magnetic recording heads, increase in the wear of the magnetic layers and deterioration of the electro-magnetic conversion properties.

To cope with these problems, the magnetic layers were conventionally reinforced by adding a small amount of one or more inorganic materials. The present inventors have conducted studies on addition of powders of inorganic materials which have been formed beforehand as unitary two-component systems as coating reinforcing agents, aiming at providing a magnetic recording medium with an enhanced coating strength and a reduced head wear. It has been a usual practice to incorporate non-magnetic inorganic materials of high hardness but, with the increasing demand for the quality of video recording tapes as well as digital equipments, the recent trend to adopt fine particle magnetic powders, highly dispersible binders and increased surface smoothness of tapes is not compatible with the durability of the magnetic layer, the frictional stability and the head smear and, accordingly, improvement in the durability of the magnetic coating, the frictional stability and the head cleaning effect has been sought for. The use of the conventional inorganic powders in such high quality tapes tends to lead to deteriorated electromagnetic properties, an insufficient reinforcement, resulting in damages to the tapes after a long period of running, or to insufficient head cleaning effect, resulting in increase in the head smear and lowering in the output. Sometimes, a poor running is also experienced due to the increase in the friction.

The present inventors came to think that the problems which accompanies the effort of manufacturing such a high quality magnetic recording medium could be solved by adequately selecting the types of inorganic materials and the their quantity to be added as the coating reinforcement materials. The present inventors, however, found that incompatible demands such as reduction in the head damage and attrition, and reduction in the tape wear and friction are not met.

Accordingly, a primary object of the invention is to provide a magnetic recording medium which exhibits not only less head smear (adhesion of the rubbed-off materials from the magnetic coating to the head) and the head friction, but also less wear of the magnetic layer.

On the other hand, it has often been a practice in the art to form back coatings on the back surfaces of magnetic recording media which are opposite to the magnetic coatings. With the increase in the density of the information to be recorded on the magnetic recording media, signals of shorter wavelength become necessary. It is well known to use such a back coating to solve problems such as drop-outs due to powdering off from the magnetic layer by friction or due to the triboelectric charges, interlayer adhesion due to the enhanced surface smoothness, friction due to the remarked enhancement of the surface smoothness of the magnetic layer, or improper winding due to the thinning of the thickness of the tape. These back coatings are formed by applying to the back surfaces of the supports coatings consisting of a binder and an antistatic agent such as carbon black or graphite, a lubricant, or inorganic particles such as silica or alumina dispersed in the binder.

For this purpose, the binder resins including thermoplastic resins, thermosetting resins or electron-curing resins have been used. For example, an OH-excess polyurethane prepolymer and polyisocyanate are used to disperse therein a lubricant, an antistatic agent, an inorganic material such as reinforcing material, etc., then applied on the back surface of the support and cured under heat to obtain a back coating. Although this type of the back coating provides such various superior properties as it has a strong adhesion to the support, exhibits a superior durability, and has a good effect on the magnetic layer, it often has problems of exhibiting a poor running due to sticking, of becoming a cause of drop-outs due to powdering of the back coating by scratching or attrition, or of causing the magnetic head to wear.

Accordingly, another object of the present invention is to provide a magnetic recording medium with a back layer having an enhanced durability, a reduced friction and a good running property.

The means to solve the problems

It is difficult to properly control the reinforcement effect and the head wear or attrition by using the conventionally used $\alpha\text{-}Al_2O_3$ alone, and sometimes there is observed an increase in the coefficient of kinetic friction. This problem can not be fully solved by the combined use of two or more inorganic particles.

It has now been found that the deficiencies of respective materials are compensated by each other when Ti is contained at the time of producing $Al_2O_3$, more specifically $\alpha\text{-}Al_2O_3$, whereby not only the problems of the head smear, the head wear and the wear of the magnetic layer are solved but also a stability of the coefficient of the kinetic friction is also achieved.

The Ti-containing $\alpha\text{-}Al_2O_3$ used in the present invention may be produced by adding Ti to a $\alpha\text{-}Al_2O_3$ powder and firing this mixture. The preferred range of the Ti content is approximately 2–10 wt % based on the weight of $\alpha\text{-}Al_2O_3$. The amount below this range cannot achieve the aimed effects while the amount above this range will increase the wear of the magnetic head.

The binder used in the present invention includes thermoplastic resins such as thermoplastic polyurethane resins and a vinyl chloride-vinyl acetate-vinyl alcohol copolymers, thermosetting resins such as thermosetting polyurethane resins, and electron beam-curing resins such as acrylic acid resins having electron-sensitive double bonds. They may be used alone or in combination. Particularly preferred are thermosetting resins and electron beam-curing resins.

The additives which may be used in the present invention include a lubricant, an antistatic agent such as carbon black and a reinforcing material. As the lubricant, myristic acid, stearic acid, butyl stearate, butyl myristate or their esters may be used.

On the other hand, as the reinforcement material the present invention contains as its essential component Ti-containing $Al_2O_3$ but inclusion of a small amount of $CrO_2$, $\alpha$-$Al_2O_3$, $TiO_2$, $\alpha$-$Fe_2O_3$, $\gamma$-$Fe_2O_3$, $\alpha$-SiC, $\beta$-SiC or the like is not excluded.

The Ti-containing $Al_2O_3$ is preferably used in the range of 0.5–1.5 wt % based on the weight of the magnetic powder. Head smear and the tape scratches will become larger and the reinforcement will not be sufficient if the amount is less than the lower limit and the head wear will become larger above the upper limit.

The present invention further provides a magnetic recording medium including a support, a magnetic layer supported on one surface of the support and a back layer supported on the other surface of the support, characterized in that the back layer comprises a powder of Ti-containing $Al_2O_3$ dispersed in a binder resin.

It is also within the present invention that the magnetic recording medium is provided with a magnetic layer as well as a back layer, both formed according to the present invention.

The binder suitable for the back layer includes thermoplastic resins such as thermoplastic polyurethane resins, vinyl chloride-vinyl acetate-vinyl alcohol copolymers, thermosetting resins such as thermosetting polyurethane resins, and electron beam-curing resins such as acrylic acid resins having electron-sensitive double bonds. They may be used alone or in combination. Particularly preferred are thermosetting resins and electron beam-curing resins.

The additives which may be used in the back layer of the present invention include a lubricant, an antistatic agent and a reinforcing material which are conventionally used in the art. As the lubricant, myristic acid, stearic acid, butyl stearate, butyl myristate or their esters may be used. As the antistatic agent, carbon black may be used.

On the other hand, as the reinforcement material the present invention contains Ti-containing $Al_2O_3$ in its back layer as its essential component but inclusion of a small amount of $CrO_2$, $\alpha$-$Al_2O_3$, $TiO_2$, $\alpha$-$Fe_2O_3$, $\gamma$-$Fe_2O_3$, $\alpha$-SiC, $\beta$-SiC or the like is not excluded.

The Ti-containing $\alpha$-$Al_2O_3$ used in the back layer of the present invention may be produced by adding Ti to a $\alpha$-$Al_2O_3$ powder and firing the resulting mixture. The preferred range of the Ti content is approximately 2–10 wt % based on the weight of $\alpha$-$Al_2O_3$. The amount below this range will increase the wear of guide members and the amount exceeding the upper limit will lower the strength of the back layer. The Ti-containing $Al_2O_3$ is preferably used in the range of 0.5–2.5 wt % based on the weight of the resin of the back layer. The amount less than this range will not be effective and the wear of guide members will become larger above the upper limit.

DESCRIPTION OF THE PREFERRED WORKING EXAMPLES

The present invention will now be fully explained in making reference to a few non-restrictive working and comparative examples. Examples 1, 2, 3(Ti-containing $Al_2O_3$ in the magnetic layer)

The following formulations were prepared.

| | |
|---|---|
| Ferromagnetic powder | 100 parts by weight |

-continued

| | |
|---|---|
| Vinyl chloride-vinyl acetate-vinyl alcohol copolymer | 10 parts by weight |
| Urethane resin | 10 parts by weight |
| Carbon black | 10 parts by weight |
| Ti-containing $Al_2O_3$ | 0.5, 1.0, 1.5 parts by weight |
| Lubricant(myristic acid and stearic acid) | 5 parts by weight |

This formulation was thoroughly blended and dispersed by a dispersing mill to form a coating which is then applied on a polyester film in such a way that the dried thickness is about 4 μm.

COMPARATIVE EXAMPLE 1

Examples 1–3 were repeated except that the Ti-containing $Al_2O_3$ was replaced by the following reinforcement materials.

| | |
|---|---|
| $TiO_2$ | 0.3 parts by weight |
| $\alpha$-$Al_2O_3$ | 0.7 parts by weight |

COMPARATIVE EXAMPLE 2

Examples 1–3 were repeated except that the Ti-containing $Al_2O_3$ was replaced by the following reinforcement material.

| | |
|---|---|
| Fe-containing $Al_2O_3$(0.2 μm) | 1.5 parts by weight |

COMPARATIVE EXAMPLE 3

Examples 1–3 were repeated except that the Ti-containing $Al_2O_3$ was replaced by the following reinforcement material.

| | |
|---|---|
| $\alpha$-$Al_2O_3$ | 0.5 parts by weight |

Specimens corresponding to Examples 1, 2 and 3 (those using 0.5, 1.5, 2.5 parts by weight of the Ti-containing $Al_2O_3$, respectively) and Comparative Examples are called #A, #B, #C, #D, #E and #F, respectively, and the following tests were conducted on them. The results are listed in Table 1.

Head smear(adhesion):

Specimen is run one hundred passes using a commercial recorder and the head is observed by naked eyes and a heavy smear is marked x, a significant is Δ, a slight is ◯, and none is ⊙.

Change in the coefficient of kinetic friction:

Specimen is run one hundred passes at a speed of 20 mm/sec past a mirror finish surface of a stainless fixed pole with the magnetic layer being kept in contact with the pole surface. The change is defined by the difference between the initial coefficient and that after 100 passes.

Damage to the magnetic layer:

Specimen is passed one hundred times by a commercial recorder and the scars are observed by naked eyes. A large scar is marked x, a small is Δ, and none is ◯.

Head wear:

A brass collar is set on the tape running portion of a recorder and specimen of 200 m is passed one hundred passes along it. The amount of wear is weighed. The value is relative.

TABLE 1

| | Ti-cont. Al$_2$O$_3$ | Head Smear | Change in Coef. Frct. | Scars | Head wear |
|---|---|---|---|---|---|
| #A | 0.5 | ◉ | 0.38→0.42 | ○ | 11 |
| #B | 1.0 | ◉ | 0.41→0.42 | ○ | 13 |
| #C | 1.5 | ◉ | 0.43→0.41 | ○ | 17 |
| #D | Comp. Ex. 1 | ○ | 0.41→0.53 | Δ | 23 |
| #E | Comp. Ex. 2 | ○ | 0.41→0.57 | ○ | 38 |
| #F | Comp. Ex. 3 | Δ | 0.43→0.60 | x | 21 |

The magnetic recording media according to the present invention exhibited a superior properties in all respects, particularly with respect to the stability of the friction and the head wear.

Examples 4, 5 and 6 (Ti-containing Al$_2$O$_3$ in the back layer)

The following formulations were prepared. vinyl chloride-vinyl acetate-vinyl alcohol copolymer

| | |
|---|---|
| (Eslec A, tradename) | 50 parts by weight |
| Urethane resin | 50 parts by weight |
| (N-2304, tradename of Nippon Polyurethane K.K) Carbon black(0.1μ) | 50 parts by weight |
| Ti-containing Al$_2$O$_3$ (Ti content of 35 wt %) | 0.5, 1.5, 2.5 parts by weight |
| Lubricant(myristic acid and stearic acid) | 3 parts by weight |
| Polyisocyanate (Colonate L, tradename of Nippon Polyurethane) | 15 parts by weight |

This formulation was thoroughly blended and dispersed by a dispersing mill to form a coating which is then applied on a polyester film as a back coating in such a way that the dried thickness is about 1.5 μm.

COMPARATIVE EXAMPLE 4

Examples 4-6 were repeated except that the Ti-containing Al$_2$O$_3$ was replaced by the following reinforcement materials.

| | |
|---|---|
| TiO$_2$ | 0.5 parts by weight |
| α-Al$_2$O$_3$ | 1.5 parts by weight |

COMPARATIVE EXAMPLE 5

Examples 4-6 were repeated except that the Ti-containing Al$_2$O$_3$ was replaced by the following reinforcement material.

| | |
|---|---|
| α-Al$_2$O$_3$ | 1.5 parts by weight |

COMPARATIVE EXAMPLE 3

Examples 1-3 were repeated except that the Ti-containing Al$_2$O$_3$ was replaced by the following reinforcement material.

| | |
|---|---|
| Fe-containing Al$_2$O$_3$ | 1.5 parts by weight |

Specimens corresponding to Examples 4, 5 and 6(0.5, 1.5, 2.5 parts by weight of the Ti-containing Al$_2$O$_3$, respectively) and Comparative Examples are labeled as #A', #B', #C', #D', #E' and #F', respectively and the following tests were conducted on them. The results were listed in Table 2.

Smear(adhesion):

Specimen is run one hundred passes past a fixed guide pole having a stainless mirror finish face with the back coat layer being kept in contact with the pole face and the guide pole smear is observed by naked eyes and a heavy smear is marked X, a significant is Δ, a slight is ○, and none is ◉.

Change in the coefficient of kinetic friction:

Specimen is run one hundred passes at a speed of 20 mm/sec past a mirror finish surface of a stainless fixed pole with the back coat layer being kept in contact with the pole surface. The change is defined by the difference between the initial coefficient and that after 100 passes.

Damage to the back coat layer:

Specimen is passed one hundred times by a commercial recorder and the scars by guide poles and other guide members and the scars are observed by naked eyes. A large scar is marked X, a small is Δ, and none is ○.

Head wear:

A brass collar is set on the tape running portion of a recorder and specimen of 200 m is passed one hundred passes along it with the back coat layer in contact with the collar. The amount of wear is weighed. The value is relative.

TABLE 2

| | Ti-cont. Al$_2$O$_3$ | Smear | Change in Coef. Frct. | Scars | Head wear |
|---|---|---|---|---|---|
| #A' | 0.5 | ○ | 0.52→0.52 | ○ | 3 |
| #B' | 1.5 | ○ | 0.49→0.49 | ○ | 4 |
| #C' | 2.5 | ○ | 0.49→0.48 | ○ | 4 |
| #D' | Comp. Ex. 4 | Δ | 0.55→0.61 | Δ | 3 |
| #E' | Comp. Ex. 5 | x | 0.53→0.57 | Δ | 6 |
| #F' | Comp. Ex. 6 | ○ | 0.52→0.55 | ○ | 12 |

The magnetic recording media having back coat layers according to the present invention exhibited a low head smear, low in friction, few scars, and less wear.

We claim:

1. A magnetic recording medium including a support and a magnetic layer supported on one surface of the support, said magnetic layer comprising a magnetic powder dispersed in a binder resin, wherein said magnetic layer contains 0.5-1.5 wt % of a powder of Ti-containing Al$_2$O$_3$ based on the weight of said magnetic powder, and wherein said Ti-containing Al$_2$O$_3$ contains 2-10 wt % of Ti based on the weight of the Al$_2$O$_3$.

2. A magnetic recording medium according to claim 1, wherein said recording medium further includes a back layer supported on the other surface of the support, wherein said back layer contains 0.5-2.5 wt % of a powder of Ti-containing Al$_2$O$_3$ dispersed in a binder resin based on the weight of said binder resin and wherein said Ti-containing Al$_2$O$_3$ contains 2-10 wt % of Ti based on the weight of the Al$_2$O$_3$.

3. A magnetic recording medium including a support, a magnetic layer supported on one surface of the support and a back layer supported on the other surface of the support, wherein said back layer contains 0.5-2.5 wt % of a powder of Ti-containing Al$_2$O$_3$ dispersed in a binder resin based on the weight of said binder resin and wherein said Ti-containing Al$_2$O$_3$ contains 2-10 wt % of Ti based on the weight of the Al$_2$O$_3$.

4. A magnetic recording medium including a support and a magnetic layer supported on one surface on the support according to any one of claims 1, 2 and 3, wherein said Ti-containing Al$_2$O$_3$ has been prepared by blending Ti with a α-Al$_2$O$_3$ powder and firing the resulting mixture.

* * * * *